G. A. LAMBERT.
SAW GAGE.
APPLICATION FILED FEB. 25, 1909.
954,192.
Patented Apr. 5, 1910.
2 SHEETS—SHEET 1.
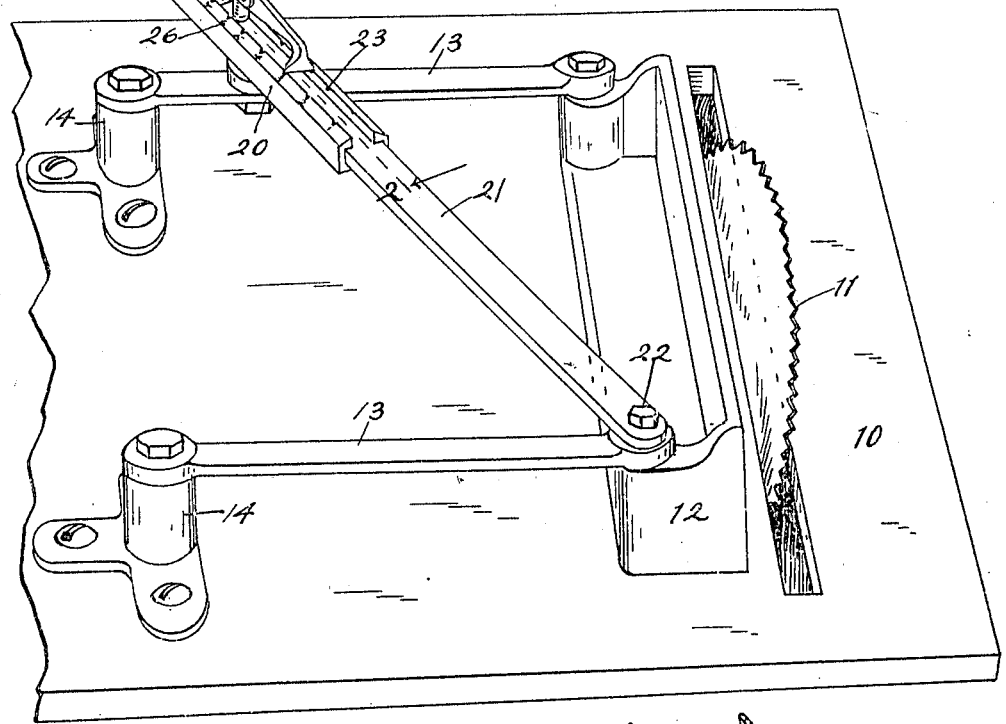
Fig-1-
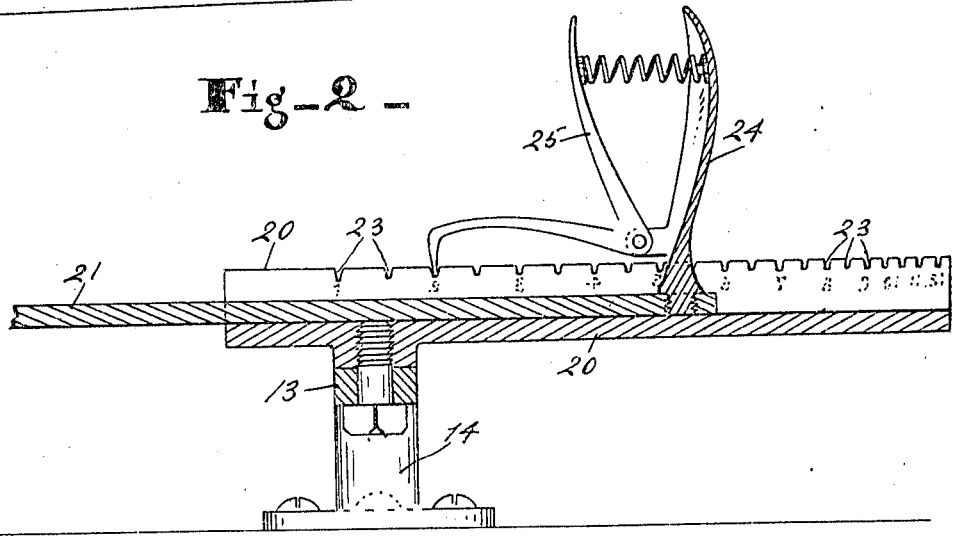
Fig-2-
WITNESSES:
W. M. Gentle.
O. M. McLaughlin
INVENTOR.
George A. Lambert.
BY
V. H. Lockwood
ATTORNEY.

G. A. LAMBERT.
SAW GAGE.
APPLICATION FILED FEB. 25, 1909.
954,192.
Patented Apr. 5, 1910.
2 SHEETS—SHEET 2.
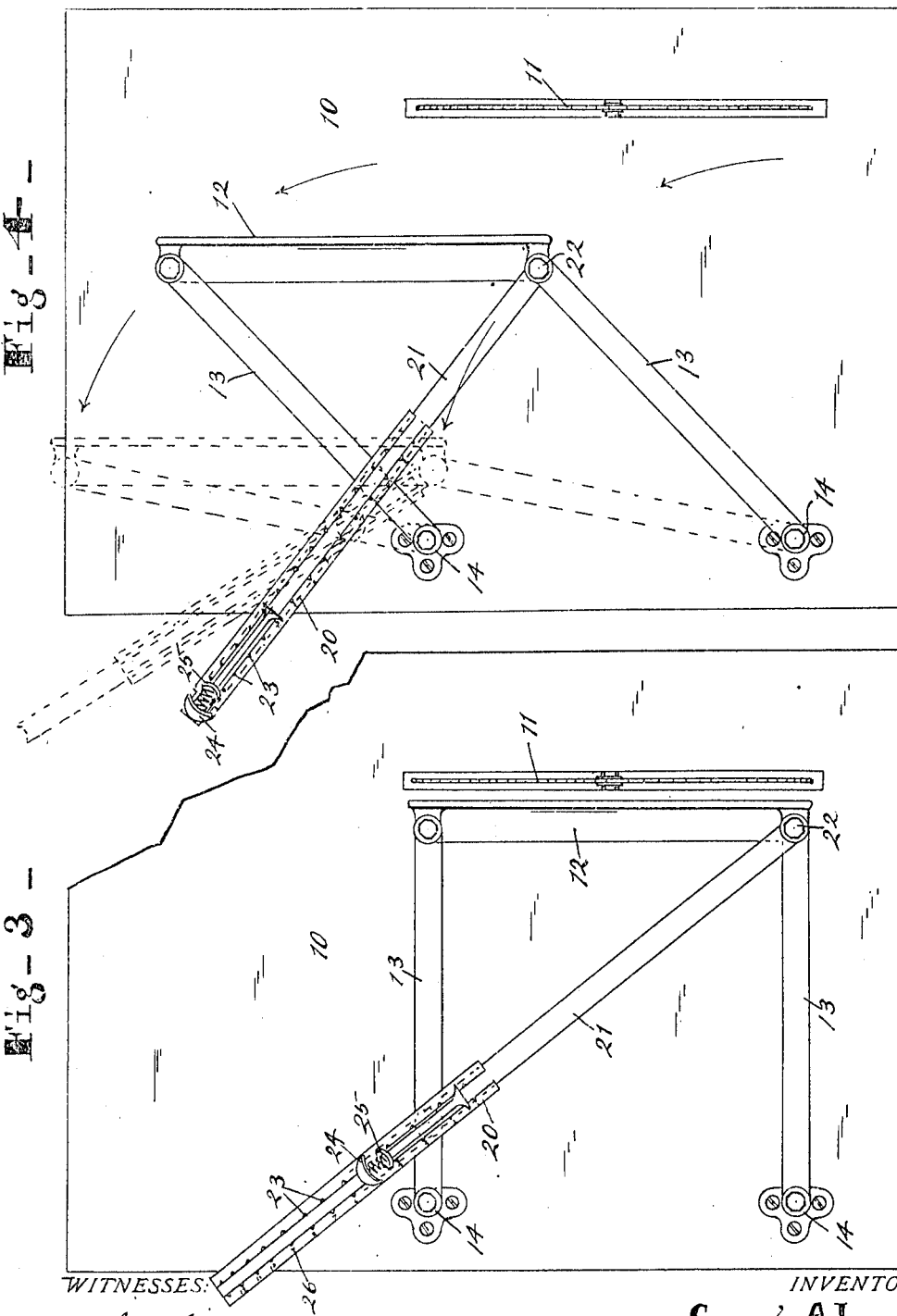
WITNESSES:
W. M. Gentle.
O. M. McLaughlin
INVENTOR.
George A. Lambert.
BY
V. H. Lockwood
ATTORNEY.

UNITED STATES PATENT OFFICE.

GEORGE A. LAMBERT, OF ANDERSON, INDIANA.

SAW-GAGE.

954,192.

Specification of Letters Patent.

Patented Apr. 5, 1910.

Application filed February 25, 1909. Serial No. 479,986.

*To all whom it may concern:*

Be it known that I, GEORGE A. LAMBERT, of Anderson, county of Madison, and State of Indiana, have invented a certain new and useful Saw-Gage; and I do hereby declare that the following is a full, clear, and exact description thereof, reference being had to the accompanying drawings, in which like numerals refer to like parts.

This invention relates to improvements in saw gages whereby the construction will be comparatively simple, and the operation easy and convenient.

The chief feature of the invention consists in mounting a gage bar on a pair of parallel pivoted arms, securing a graduated scale bar on one of said pivoted arms, and a diagonal bar extending preferably from one end of the gage bar to and in sliding engagement with said scale bar, and having means thereon for engaging the scale bar and locking the gage bar in place.

The nature of this invention will be understood from the accompanying drawings and the following description and claim:

In the drawings, Figure 1 is a perspective view of a saw-table with a gage in position near the saw, the table being partly broken away. Fig. 2 is a section on the line 2—2 of Fig. 1. Fig. 3 is a plan view of Fig. 1. Fig. 4 is the same with the gage adjusted farther from the saw in full lines and still farther in dotted lines.

In detail, there is shown a table 10 with a saw 11. The gage bar 12 is pivoted at each end to a bar 13 that is pivotally mounted by means 14 to the table. The bars 13 are parallel and when the gage bar is near the saw it is at right angles to the arms 13. On one of said bars 13 there is secured a scale bar 20 between the ends. It is slotted to receive in sliding engagement the setting bar 21, which is pivoted by a bolt 22 to the other arm 13 and gage bar 12. The bar 21 should preferably be located near the pivot 22, but not necessarily at that point. The scale bar 20 has notches 23 at graduated distances from each other in its upper surface on each side of the slot, through which the handle 24 projects upwardly. This handle 24 has a spring catch 25 that engages the notches 23. Numerals 26 are located on the scale bar 20 in association with the series of notches 23, and indicate the number of inches between the saw and gage bar and, therefore, the thickness of the strip of lumber that would be cut. In Fig. 1 the catch 25 is in the notch marked "3," indicating that the saw would cut a three-inch strip. In Fig. 2 it would cut a two-inch strip.

It is observed that while there is a sliding engagement between the setting bar 21 and the scale bar 20, still the scale bar 20 moves somewhat, that is, along with the arm 13 on which it is secured. This is an advantage inasmuch as it reduces the extent of sliding engagement between the bar 21 and bar 20 and enables a greater series of notches 23 to be put on the scale bar, and also reduces the length of the scale bar 20 as compared with what would be necessary were said scale bar wholly stationary.

What I claim as my invention and desire to secure by Letters Patent is:

In a saw gage, the combination with a gage bar, a pair of parallel arms to which it is pivoted, and a setting bar pivoted at one end near one end of the gage bar, of a scale bar pivotally secured to the arm remote from the pivoted end of said setting bar along which the other end of said setting bar is slidable, said scale bar being provided with graduations for indicating the distance between the saw and the gage bar, and means for securing the setting bar to the scale bar.

In witness whereof, I have hereunto affixed my signature in the presence of the witnesses herein named.

GEORGE A. LAMBERT.

Witnesses:
   W. T. WATTS,
   Mrs. E. A. HUNT.